United States Patent Office 3,709,912
Patented Jan. 9, 1973

3,709,912
PROCESS FOR PREPARING d-RIBONOLACTONE
Ryuji Tanaka, Tokyo, and Akio Yasuno, Narashino-shi, Japan, assignors to Tokyo Tanabe Company, Limited, Tokyo, Japan
No Drawing. Filed Mar. 13, 1969, Ser. No. 807,065
Int. Cl. C07d 5/06
U.S. Cl. 260—343.6     8 Claims

ABSTRACT OF THE DISCLOSURE

Process for preparing d-ribonolactone which includes the steps of adding one member selected from the group consisting of iron powder, ferrous hydroxide, ferrous sulfate and ferrous oxalate, to an aqueous solution wherein d-ribonic acid or an alkaline earth metal salt thereof coexists with d-arabonic acid or an alkaline earth metal salt thereof, filtering the reaction solution, removing the thus formed ferrous d-ribonate from said filtrate, adding said ferrous d-ribonate together with an acid selected from the group consisting of sulfuric acid, oxalic acid and phosphoric acid to water or to an organic solvent, heating the resultant mixture to form free d-ribonic acid and the co-product iron salt of said acid therein, removing the co-product iron salt of said acid therefrom to obtain a solution of free d-ribonic acid, and concentrating said solution so as to lactonize said d-ribonic acid.

---

The present invention relates to a process for preparing d-ribonolactone. More particularly the invention relates to a process for preparing d-ribonolactone, which comprises adding iron ions to an aqueous solution wherein d-ribonic acid or a salt thereof coexists with d-arabonic acid or a salt thereof, converting said ferrous d-ribonate into free d-ribonic acid, and lactonizing the d-ribonic acid.

d-Ribonic acid is an aldonic acid having five carbon atoms and its lactone is a useful substance as a material for synthesizing Vitamin $B_2$ and ribonucleotide which are medicaments or nutrients.

d-Ribonic acid or salt thereof has hitherto been prepared by epimerizing d-arabonic acid or salt thereof, which are stereoisomers of d-ribonic acid or salt thereof, in an aqueous solution in the presence of basic substances such as pyridine, calcium hydroxide, etc. (U.S.P. No. 2,438,881 and Japanese Pat. No. 221,306). However, the degree of conversion from the d-arabonic acid or salt thereof into the d-ribonic acid or salt thereof, i.e., the degree of the epimerization in the above reaction is essentially 25–30% of the d-arabonic acid or salt thereof used, and a large amount of the d-arabonic acid or salt thereof coexists with product d-ribonic acid or salt thereof in the reaction solution. Consequently, the d-ribonic acid or salt thereof must be isolated and purified from said reaction solution. However, there have been various difficulties in such processes of isolation and purification.

That is, practical methods have been proposed where the d-aldonic acids or salts thereof coexisting in an aqueous solution are converted into such salts as provide large differences in solubilities of the two d-aldonic salts in water. For example, when both d-aldonic acids in the solution are converted into calcium salts thereof, such process being utilized generally, the solubility of calcium d-ribonate in water and that of calcium d-arabonate are 80% and 1% respectively, and therefore both calcium salts would readily be isolated from each other by utilizing the above large difference in solubility. However, the solubility of said d-arabonate in the mixed solution of the calcium aldonates as described above is far greater than the above value by reason of the influences of the co-existing calcium d-ribonate and impurities which are produced through decomposition of these aldonic acids in the steps of the preceding epimerizing reaction, and therefore crystallization and isolation of said calcium d-arabonate from such a mixed solution cannot be completely carried out. Accordingly, it has been unavoidable that calcium d-arabonate amounting to 10–20% of the total solid matter in the obtained mother liquor (filtrate) coexists in a dissolved state in said liquor.

Methods are known where cadmium ions or mercury ions are added to such a mixed aqueous solution of the d-aldonic acids to convert both aldonic acids into cadmium salts or mercury salts and each of the d-ribonates thereof is isolated by utilizing the difference in solubilities of the d-ribonate thereof and d-arabonate thereof, respectively (German Pat. No. 1,148,991 and Japanese patent publication No. 3062/1959). However, said methods have such difficulties in practice, that the operations are complex and the materials used are expensive, and moreover in the case of the mercury salt method, there is a disadvantage in view of industrial wastes which has been regarded as an important problem in recent years. Further, a method has been recently published wherein zinc ions are added to a mixed aqueous solution of the aldonic acids or salts thereof to convert both aldonic acids into zinc salts and d-ribonate is isolated by utilizing the difference in solubilities of the above d-ribonate and d-arabonate (Japanese patent publication No. 19287/1968). It seems that said method using zinc ions is far more advantageous in comparison with the other methods, however, it can be pointed out that the zinc compound is not favourable as an industrial material in view of industrial wastes.

We have investigated the method of isolating and purifying d-ribonic acid from the mixed solution of the d-aldonic acids or salts thereof as described above, for the purpose of removing the defects of the above-mentioned methods. And we have found that d-ribonolactone of high purity can be obtained in good yield and without disadvantages connected with industrial wastes by converting the d-ribonic acid or salt thereof in said mixed solution to the iron salt.

The invention is a process for preparing d-ribonolactone, which comprises adding a substance releasing iron ions to an aqueous solution wherein d-ribonic acid ions coexist with d-arabonic acid ions, removing thus formed ferrous d-ribonate from the reaction solution, converting said ferrous d-ribonate into free acid and lactonizing it.

The first object of the invention is to prepare the d-ribonic acid, and further, the lactone thereof of high purity in high yield from the aqueous solution wherein the d-ribonic acid or salt thereof coexists with d-arabonic acid or salt thereof. The second object of the invention is to easily prepare the d-ribonolactone by using inexpensive and safe compounds as industrial materials.

According to the invention, as the aqueous solution wherein the d-ribonic acid ions coexist with the d-arabonic acid ions, there is a solution wherein the d-ribonic acid coexists with the d-arabonic acid, or that wherein an alkaline earth metal salt of d-ribonic acid coexists with that of d-arabonic acid. More concretely, it is the epimerizing reaction solution of the d-arabonic acid above mentioned; the solution wherein the d-arabonic acid remaining in said reaction solution is converted into the alkaline earth metal salt and removed; the epimerizing reaction solution of the alkaline earth metal salt of d-arabonic acid; the solution wherefrom the alkaline earth metal salt of the d-arabonic acid remaining in the epimerizing reaction solution of alkaline earth metal salt of d-arabonic acid is removed; or the solution of free aldonic acids which is prepared by adding an acid to the epimerizing reaction solution of alkaline earth metal salt of d-arabonic acid, filtering the reaction solution concentrating the above reaction solution and adding an organic solvent to the concentrate obtained to crystallize out and remove said d-arabonic acid; etc. If the substance releasing iron ions is added to a mixed aqueous solution of alkali metal salts of d-aldonic acids in the same way as that of the present invention, the solubilities of alkali metal salts or alkali hydroxides metal co-produced simultaneously by an exchange reaction or substitution reaction are much larger than that of the ferrous d-ribonate formed in the reaction solution, and therefore it becomes impossible to isolate said alkali metal salts or hydroxides from said reaction solution prior to crystallizing the ferrous d-ribonate.

According to the present invention, iron powder, ferrous hydroxide or iron salts are added to the mixed aqueous solution of the aldonic acids or salts thereof, as the substances releasing iron ions. For the mixed aqueous solution of the free aldonic acids, iron powder or ferrous hydroxide is used, and for the aqueous solution of the mixed alkaline earth metal salts of aldonic acids, iron salts such as ferrous sulfate or ferrous oxalate which co-produce water-insoluble salts by exchange reactions with the alkaline earth metal salt of d-ribonic acid are employed. Said substances releasing iron ions are added in a slightly excessive amount above the equivalent total amount of the d-ribonic acid ions and the d-arabonic acid ions. Said total amount of the aldonic acids ions can be found by the titrated acidity in the case of using the aqueous solution of the free aldonic acids and by calculation from the analytical value of total alkaline earth metal contained in the case of using the aqueous solution of the alkaline earth metal salts of the aldonic acids.

According to the invention, the reaction forming the ferrous d-ribonate above mentioned is carried out in a temperature range from ordinary ambient temperature to 100° C. Using ferrous sulfate, which is water-soluble, as the substance releasing iron ions, said reaction is completed at relatively low temperature and within a comparatively short time. However, it requires a few hours heating to accomplish said reaction when iron powder, ferrous hydroxide or ferrous oxalate, which are water-insoluble or less soluble, is employed. Using the aqueous solution of the mixed alkaline earth metal salts of the aldonic acids and an iron salt as the substance releasing iron ions, a water-insoluble alkaline earth metal salt of sulfuric acid or oxalic acid is co-produced. Said insoluble alkaline earth metal salts co-produced and the remains of the substances releasing iron ions which are water-insoluble or less soluble in the reaction solution, can be removed easily from said reaction solution by filtration.

The filtrate of said reaction solution thus obtained is either concentrated in vacuo, filtered again if necessary, and the concentrate is cooled; or said filtrate is cooled directly after an organic solvent is added thereto so as to crystallize out the less soluble ferrous d-ribonate. Monohydric alcohols having 1–4 carbon atoms, e.g., methanol, ethanol, n-propanol, iso-propanol, n-butanol, and secondary butanol, and or acetone etc. can be used as said organic solvent. The crystals of the ferrous d-ribonate are isolated from the solution, washed with a small amount of ice water and dried at low temperature. The yield calculated as free d-ribonic acid, amounts to ca. 25.0% and upward of the amount of the d-arabonic acid or salt thereof used in the initial epimerizing reaction.

Said crystals are pale yellow needles having M.P. 118–120° C. (with decomposition). The values of elementary analysis and values of water of crystallization analyzed according to the Karl-Fischer's Titration Method are as shown below:

|  | C | H | Fe at— | | $H_2O$ |
|---|---|---|---|---|---|
|  |  |  | Colorimetry | Gravimetry |  |
| Theoretical value | 26.20 | 5.67 | 12.09 | 12.09 | 15.59 |
| Found value | 25.98 | 5.56 | 12.12 | 12.14 | 15.58 |

The substance obtained by decomposing said crystals with hydrochloric acid can be identified as d-ribonic acid by comparing it with pure d-ribonic acid obtained by means of thin-layer-chromatography.

It can be determined from the above data that said crystals are ferrous d-ribonate expressed by the chemical formula $(C_5H_9O_6)_2Fe \cdot 4H_2O$, showing an iron atom combined with each carboxyl group of 2 molecules of the d-ribonic acid and having 4 molecules of water of crystallization. Said ferrous d-ribonate is a compound which has not yet been described in the literature.

The above ferrous d-ribonate has a solubility below 0.2% in water at a temperature of 0° C. and above 65% at a temperature of 80° C., and accordingly it can be recrystallized from water most easily. The ferrous d-ribonate has not only very low solubility in water, but also it can be observed that said d-ribonate in said reaction solution receives little effects to promote its solubility from co-existence with remaining ferrous d-arabonate and with impurities co-produced in the step of the epimerizing reaction, and that therefore the rate of its crystallization from said reaction solution is not lowered.

It was observed that when a solution obtained by adding iron ions to an aqueous solution of pure d-arabonic acid was concentrated in vacuo, crystals did not appear and amorphous precipitates were barely formed in the case of adding methanol to the above concentrate. However, said precipitates were extremely hygroscopic and became readily viscous in the atmosphere. The above hygroscopic substance was presumed to be ferrous d-arabonate and recognized to have an extremely high solubility in water.

According to the invention, because of the low solubility of the ferrous d-ribonate in water, the large difference in the solubilities of the ferrous d-ribonate due to differences in temperature and the extremely high solubility of the ferrous d-arabonate in water, as described above, the ferrous d-ribonate can be readily separated from the mixed aqueous solution containing the d-aldonic acids or salts thereof. The above reaction for forming the ferrous d-ribonate is expressed by the following chemical formulae:

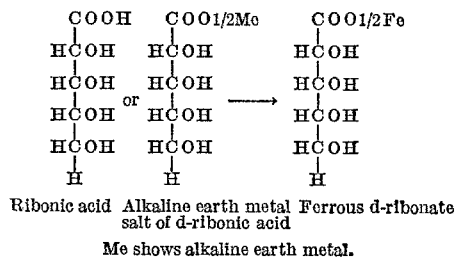

Ribonic acid   Alkaline earth metal   Ferrous d-ribonate
salt of d-ribonic acid

Me shows alkaline earth metal.

According to the invention, in order to free and remove the iron atoms from the ferrous d-ribonate obtained as described above, said ferrous d-ribonate together with the calulated amount of oxalic acid, phosphoric acid or sulfuric acid are added to water or an organic solvent which dissolves the d-ribonic acid, and the mixture is heated with stirring to simultaneously co-produce the iron salt of said acid. Ferrous oxalate and ferrous phosphate thus co-produced in the above reaction mixture are insoluble in water, and therefore they can be removed readily by filtration even in the case of carrying out the reaction in water. However, since ferrous sulfate, which is co-produced similarly the case of using sulfuric acid, is water-soluble, the aqueous reaction solution is concentrated in vacuo to a syrup and an organic solvent dissolving d-ribonic acid is added to said syrup to deposit and enable removal of said ferrous sulfate. When carrying out the above reaction in said organic solvent, d-ribonic acid formed is soluble in said organic solvent, however, each of the above iron salts of the acids which is co-produced is insoluble and can be removed easily from the reaction mixture by filtration. As said organic solvents dissolving d-ribonic acid, monohydric alcohols having 1–4 carbon atoms, acetone, etc., similar to those used in the step of crystallizing out the ferrous d-ribonate, are employable. The filtrate of the aqueous reaction solution or the solution of the organic solvent obtined by tion or the solution of the organic solvent obtained by removing the iron salts of the acids co-produced is concentrated in vacuo to syrup, and said syrup is cooled and seeded with little crystals of d-ribonolactone to crystallize out lactone of the same kind.

The d-ribonolactone thus obtained has M.P. 78–80° C. and high purity, and according many advantages are brought about in the succeeding reactions for synthesizing Vitamin B$^4$$_2$ or ribonucleotide using the d-ribonolactone obtained in the invention, i.e., improvement in the yield, reduction in invalid consumption of other materials used and facilitations of treatment and operation in the above synthesizing reactions, etc. The iron powder or iron compounds used in the process according to the invention are inexpensive (e.g., the cost is about $\frac{1}{3}$–$\frac{1}{4}$ as much as that of zinc compounds), and moreover these iron compounds can be used repeatedly by recycling in the process. Further, the iron compounds used in the invention are not toxic to organisms and hygienic for industrial use. The ferrous d-ribonate itself obtained in the middle of the process according to the invention, can be expected to have a medicament or a nutrient containing iron.

EXAMPLE 1

500 g. of calcium d-arabonate were epimerized according to the conventional process and the reaction solution was concentrated to crystallize and recover ca. 305 g. of the calcium arabonate which had not reacted. 76.0 g. of ferrous oxalate were added to the above filtrate wherein the calcium d-ribonate coexisted with the remains of the d-arabonate and the other impurities co-produced in the above epimerizing reaction and the mixture was heated at a temperature of 100° C. with stirring for 5 hours to crystallize out calcium oxalate. A small amount of activated charcoal was added to the reaction mixture, and the filtrate of the above mixture was concentrated in vacuo and thereafter the concentrate was cooled to crystallize out ferrous d-ribonate amounting to 119.5 g., M.P. 119° C. (decomp.). Said ferrous d-ribonate together with 34.5 g. of oxalic acid were added to 250 ml. of water and the mixture was heated at a temperature of 80° C. for an hour. The reaction mixture was cooled to crystallize out ferrous oxalate, the filtrate of said reaction mixture was concentrated in vacuo to a syrup, and said syrup was seeded with little crystals of d-ribonolactone to crystallize out the lactone of the same kind. Yield 75.5 g., M.P. 80° C.

EXAMPLE 2

129.0 g. of ferrous sulfate were added to the filtrate of the epimerizing reaction solution obtained in the same way as in Example 1 and the mixture was heated at a temperature of 80° C. with stirring for 3 hours to crystallize out calcium sulfate. A small amount of activated charcoal was added to the reaction mixture, the filtrate of the above mixture was concentrated in vacuo, and thereafter the concentrate was cooled to crystallize out ferrous d-ribonate amounting to 122.0 g., M.P. 118° C. (decomp.). Said ferrous d-ribonate together with 26.5 g. of phosphoric acid were added to 250 ml. of water, and the mixture was heated at a temperature of 95° C. with stirring for 5 hours. The reaction mixture was cooled to crystallize out ferrous phosphate, the filtrate of said reaction mixture was concentrated in vacuo to a syrup, and 71.5 g. of crystalline d-ribonolactone were obtained in the same way as in Example 1.

EXAMPLE 3

129.0 g. of ferrous sulfate was added to the filtrate of epimerizing reaction solution obtained in the same way as as in Example 1 and the mixture was heated at a temperature of 80° C. with stirring for 3 hours to crystallize out calcium sulfate. A small amount of activated charcoal was added to the reaction mixture, and the filtrate of the above mixture was concentrated in vacuo and thereafter the concentrate was cooled to crystallize out ferrous d-ribonate amounting to 121.8 g. Said ferrous d-ribonate together with 26.0 g. of sulfuric acid were added to 250 ml. of water, the mixture was heated to a temperature of 50° C. with stirring for an hour, and thereafter the reaction mixture was concentrated in vacuo to a syrup. 180 ml. of hot methanol were added to said syrup and ferrous sulfate which crystallized out was removed by filtration. The filtrate obtained was concentrated in vacuo to a syrup and 76.5 g. of crystalline d-ribonolactone were obtained in the same way as in Example 1.

EXAMPLE 4

129.0 g. of ferrous sulfate were added to the filtrate of the epimerizing reaction solution obtained in the same way as in Example 1 and the mixture was heated at a temperature of 80° C. with stirring for 3 hours to crystallize out calcium sulfate. A small amount of activated charcoal was added to the reaction mixture and the mixture was filtered. 200 ml. of methanol were added to the filtrate and the methanolic solution was cooled to crystallize out ferrous d-ribonate amounting to 121.5 g. Said ferrous d-ribonate was suspended in 300 ml. of secondary butanol containing 26.2 g. of concentrated sulfuric acid and the suspension was stirred at a temperature of 80° C. for 2 hours to crystallize out ferrous sulfate. The reaction mixture was filtered while hot, the filtrate was concentrated in vacuo to a syrup and 75.5 g. of crystalline d-ribonolactone were obtained in the same way as in Example 1.

EXAMPLE 5

54.5 g. of oxalic acid were added to the filtrate of the epimerizing reaction solution obtained in the same way as in Example 1, the mixture was heated, and calcium oxalate which crystallized out was filtered off while hot. 23.6 g. of iron powder were added to the filtrate thus obtained, the mixture was heated at a temperature of 100° C. with stirring for 8 hours and activated charcoal was added to the reaction mixture. The above mixture was filtered, 300 ml. of acetone were added to the filtrate and the resultant solution was cooled and 121.0 g. of crystalline ferrous d-ribonate were obtained. Said ferrous d-ribonate was suspended in 250 ml. of isopropanol containing 34.5 g. of oxalic acid and the suspension was heated at a temperature of 75° C. with stirring for 4 hours. The reaction mixture was filtered while hot, the filtrate was concentrated in vacuo to a syrup and 74.6 g. of crystalline d-ribonolactone were obtained in the same way as in Example 1.

EXAMPLE 6

38.5 g. of ferrous hydroxide (prepared from ferrous sulfate and sodium hydroxide) were added to the impure solution of d-ribonic acid obtained after removing calcium oxalate by filtration in the same way as in Example 5, and the mixture was heated at a temperature of 100° C. with stirring for 4 hours. Activated charcoal was added to the reaction mixture and the mixture was filtered. 200 ml. of ethanol were added to the filtrate, and this ethanolic solution was cooled and 118.5 g. of crystalline ferrous d-ribonate were obtained. Said ferrous d-ribonate was suspended in 400 ml. of methanol ethanol containing 25.5 g. of phosphoric acid and the suspension was heated at a temperature of 70° C. with stirring for 7 hours. The reaction mixture was cooled to crystallize out ferrous phosphate, the filtrate of said mixture was concentrated in vacuo to a syrup, and 75.5 g. of crystalline d-ribonolactone were obtained in the same way as in Example 1.

We claim:

1. A process for preparing d-ribonolactone which comprises adding a substance releasing iron ions and selected from the group consisting of iron powder, ferrous hydroxide, ferrous sulfate and ferrous oxalate to an aqueous solution wherein d-ribonic acid ions coexist with d-arabonic acid ions; subjecting the resulting mixture to a temperature ranging from ambient to 100° C. so as to form a mixture of ferrous d-arabonate and ferrous d-ribonate therein; filtering the reaction solution; removing ferrous d-ribonate having the chemical formula $$(C_5H_9O_6)Fe \cdot 4H_2O$$

from said filtrate; adding said ferrous d-ribonate together with an acid selected from the group consisting of sulfuric acid, oxalic acid, and phosphoric acid to a solvent; heating the resulting mixture at a temperature from 50° C. to 100° C. to form free d-ribonic acid and to co-produce an insoluble iron salt of said acid therein; removing the co-produced iron salt of said acid therefrom to obtain a solution of d-ribonic acid; and concentrating said solution in vacuo so as to lactonize said d-ribonic acid.

2. The process of claim 1 wherein the starting aqueous solution contains an alkaline earth metal salt of d-ribonic acid coexisting with an alkaline earth metal salt of d-arabonic acid and wherein the substance releasing iron ions is selected from the group consisting of ferrous sulfate and ferrous oxalate.

3. The process of claim 1 wherein removal of ferrous d-ribonate from the filtrate comprises the steps of concentrating said filtrate in vacuo, cooling the resultant concentrate to cause ferrous d-ribonate to crystallize from solution, and separating the crystallized ferrous d-ribonate from the mother liquor.

4. The process of claim 1 wherein removal of ferrous d-ribonate from the filtrate comprises the steps of adding to said filtrate an organic solvent selected from the group consisting of methanol, ethanol, n-propanol, isopropanol, n-butanol, secondary butanol, and acetone; cooling the mixture to cause ferrous d-ribonate to crystallize from solution; and separating the crystallized ferrous d-ribonate from the mother liquor.

5. The process of claim 1 wherein the solvent to which ferrous d-ribonate together with an acid are added is water, said acid is selected from the group consisting of oxalic acid and phosphoric acid, and the co-produced water-insoluble ferrous oxalate or ferrous phosphate is removed from the reaction mixture by a method selected from filtration and centrifugation.

6. The process of claim 1 wherein the solvent to which ferrous d-ribonate together with an acid are added is water; said acid is sulfuric acid; and removal of co-produced water-soluble ferrous sulfate from the reaction mixture comprises the steps of concentrating the reaction mixture, adding to the concentrate an organic solvent selected from the group consisting of methanol, ethanol, n-propanol, isopropanol, n-butanol, secondary butanol, and acetone to cause ferrous sulfate to crystallize from solution, and separating the crystallized ferrous sulfate from the mother liquor.

7. The process of claim 1 wherein the solvent to which ferrous d-ribonate together with an acid are added is an organic solvent selected from the group consisting of methanol, ethanol, n-propanol, isopropanol, n-butanol, secondary butanol, and acetone and wherein the insoluble co-produced ferrous salt of said acid is removed from the reaction mixture by a method selected from filtration and centrifugation.

8. The process of claim 1 wherein the concentrated solution of d-ribonic acid is seeded with small crystals of d-ribonolactone to cause d-ribonolactone to crystallize from solution.

References Cited
UNITED STATES PATENTS

| | | | |
|---|---|---|---|
| 2,438,881 | 3/1948 | Sternbach | 260—343.6 |
| 2,438,882 | 3/1948 | Sternbach | 260—343.6 |

ALEX MAZEL, Primary Examiner

A. M. TIGHE, Assistant Examiner